3,822,122
   METHOD OF MAKING FLEXED GLASS
         COMPOSITE ARTICLE
Emile Plumat, Gilly, Jean Schottey, Montignies-sur-
  Sambre, and Pol Baudin, Ransart, Belgium, assignors
  to Glaverbel S.A., Watermael-Boitsfort, Belgium
       Filed June 1, 1971, Ser. No. 148,874
Claims priority, application Great Britain, May 21, 1971,
                    16,287/71
              Int. Cl. C03c 21/00
U.S. Cl. 65—30                                   29 Claims

ABSTRACT OF THE DISCLOSURE

A method of making an article from a plurality of components including a piece of glass or vitrocrystalline material which is chemically tempered and which is maintained in an elastically flexed condition such that compressive stresses are present in at least one face of the piece which is an exposed face of the article and the article made by that method.

BACKGROUND OF THE INVENTION

This invention relates to a method of making an article and to the article made thereby, particularly to a method and article which includes a plurality of components including a piece of chemically tempered glass or vitrocrystalline material assembled such that the glass or vitrocrystalline material is maintained in an elastically flexed condition.

The term "piece" is used in this specification without implying any size limitation. Thus the term applies equally to pieces of a size suitable for window panes and door panels and to pieces of much smaller size, e.g., instrument dial covers and lenses.

The term "vitrocrystalline material" denotes material formed from glass by a treatment which produces one or more crystalline phases therein.

It is known to increase the tensile strength of a piece of glass by tempering it, e.g. by a thermal or chemical tempering treatment. A tempering treatment as applied to a piece of glass is one which produces permanent compressive stresses in exterior layers of the glass. By virtue of the compressive surface stresses a piece of tempered glass has a higher resistance to breakage by flexure.

Another effect of a tempering treatment is to set up tensile stresses in internal layers of the piece of glass with the result that if the piece breaks it does so into a multiplicity of fragments which are less liable to cause personal injuries due to laceration than broken pieces of untempered glass.

The combined effects of an increased tensile strength and improved breakage characteristics from the point of view of personal safety make the performance of a tempering treatment of particular advantage in the manufacture of glazing panels, e.g., vehicle windshields.

Chemical tempering can set up very high compressive surface stresses and can be applied to thin pieces of material, e.g., glass sheets 3 mm. or less in thickness.

Chemical tempering involves the diffusion of ions into the surface of the material being strengthened from a contacting medium, preferably in a molten state, whereby the composition of the surface is modified and compressive stresses are set up. The compressive stresses are set up in the surface either as the ion diffusion proceeds or subsequently, when the material under treatment cools. Usually the chemical treatment comprises an ion exchange, preferably an exchange of alkali metal ions, between the material under treatment and the contacting medium.

In one form of chemical tempering, ions in surface layers of the material are replaced by larger ions while the surface of the material is at a temperature (preferably below the annealing point of the vitreous phase or phases) which is insufficiently high to permit complete stress relaxation to occur in the time lapse during which ion substitution takes place. The ion exchange in this form of process may, e.g., be a replacement of sodium ions in the material by potassium ions in the contacting medium which may, e.g., be a molten potassium salt.

In another form of chemical tempering process, ions in surface layers of the material are replaced by ions which confer on the material a lower coefficient of thermal expansion. The ion exchange is performed at a temperature sufficient to allow stress relaxation to occur in the time lapse during which ion substitution takes place. In this form of process, the compressive surface stresses are set up when the material cools. The ion exchange may, e.g., be a replacement of sodium ions in the material by lithium ions in the contacting medium which may, e.g., be a molten lithium salt.

Chemical tempering can be carried out on any type of glass or vitrocrystalline material so long as there is a sufficient proportion of a vitreous phase or phases at the surface of the piece to be tempered for the necessary ion exchange to occur between such vitreous phase or phases and the contacting treatment medium.

In the performance of a chemical tempering treatment, ion diffusion preferably takes place with respect to both sides of the piece being tempered. However, the chemical tempering may be effected by causing ions to diffuse into only one side of the piece. This will indirectly cause compressive stressing of the external layers of glass or vitrocrystalline material at the other side of the piece.

Preferably both sides of the piece of glass are compressively stressed to substantially equal extents by the chemical tempering treatment. However, the compressive stressing at the different sides may be different. The final mechanical specifications of the piece of glass can in this way be adapted to specific requirements related to the particular article to be made. Advantageously, prior to chemical tempering, at least the side of the piece of glass or vitrocrystalline material in which further compressive stresses are to be produced by flexing, is subjected to a surfacing treatment to improve its quality.

A piece of glass can, for example, be surface treated by contacting it with a solvent which removes superficial surface layers from the piece in at least one part of its area. Such a surfacing treatment renders the subsequently performed chemical tempering treatment more effective. Such a surfacing treatment can be easily and quickly performed. As a solvent, fluorine-containing media are preferred, e.g., hydrofluoric acid. When using such a medium, fluorine ions diffuse into the surface layers of the glass. The presence of such fluorine ions in the glass improves its resistance to iridescence.

An alternative type of surfacing treatment which can be performed on a piece of glass prior to chemical tempering and which also improves the quality of the surface and enables the tempering treatment to be more effective is a fire-polishing treatment. Such a treatment can be performed in situations where the use of chemical media is not convenient or practicable. Fire polishing can be performed as a step in the production of flat glass so that continuous processing is easily possible.

A piece of glass or vitrocrystalline material can moreover be surface treated by a mechanical polishing treatment.

The elastic flexing of the piece of chemically tempered glass or vitrocrystalline material increases the magnitude of the compressive surface stresses induced by the tempering treatment and also establishes such stresses through surface layers of greater depth. For example, after all-over chemically tempering a flat sheet of glass 1.3 mm. in thickness, it was found that the compressively stressed surface layers had a thickness of the order of 35 microns. By flexing the sheet the concavely curved surface was placed under additional compressive stress and the compressively stressed surface layers at the concave side of the sheet then had a depth of a few hundred microns. Unfortunately it has been found that glass which has been chemically tempered by an ion diffusion treatment often does not have sufficient resistance to breakage under the impact of small hard objects which indent or penetrate the glass surface. Chemically tempered vehicle windshields, for example, often break when they are forcibly struck by small stones thrown up by the wheels of other vehicles.

SUMMARY OF THE INVENTION

It is an object of the present invention to provide an article incorporating a plurality of components, including a piece of glass or vitrocrystalline material.

It is another object of the present invention to provide an article which includes a piece of chemically treated glass or vitrocrystalline material which is maintained in an elastically flexed condition in assembly such that compressive stresses are present in at least one face of the piece of glass and the face is exposed.

It is a further object of the present invention to provide an article which includes a piece of chemically treated glass or vitrocrystalline material which is maintained in an elastically flexed condition by at least one other of the plurality of components.

These and other objects according to the invention are achieved by the method of making an article including a piece of glass or vitrocrystalline material whereby such piece can be given both a relatively safe breakage characteristics and a substantial resistance to breakage by the impact of small hard objects. The invention is useful in the production of glazing panels for buildings, vehicles and other purposes.

According to the present invention, a method of making an article comprising a plurality of components including a piece of glass or vitrocrystalline material, which provides at least one exposed face of the article, is characterized in that the piece of glass is subjected to a chemical tempering treatment and the article components are then assembled so that in the assembled article the piece is held in an elastically flexed condition. As a result, compressive stresses are induced in one side of the piece of glass and that side provides an exposed face of the article.

The compressive surface stresses in a piece of chemically tempered glass or vitrocrystalline material are normally confined to surface layers and are much shallower than the compressively stressed surface layers which have been thermally tempered. However, when a piece of chemically tempered glass or vitrocrystalline material is elastically flexed, the forces acting thereon create additional compressive stresses on at least one side of the piece of glass and also cause a modified surface stress distribution depth-wise of the piece. As a result high compressive stresses are present and in surface layers of greater depth. It has been found that in this condition, the piece of glass has an increased resistance to breakage on the one side. The invention utilizes this phenomenon by incorporating a piece of chemically tempered glass or vitrocrystalline material in an article, in a flexed condition, such that the side at which the glass or vitrocrystalline material is subjected to the additional compressive stresses provides an exposed face of the article. The optical and other desirable properties of the glass or vitrocrystalline material are thus present at least on one face of the article but without such material having the usual degree of susceptibility to breakage.

In the method of making an article according to the present invention, the piece of glass is preferably chemically tempered and held elastically flexed to a degree such that compressive surface stresses at one side of the piece of glass extend over at least twice the depth to which compressive stresses extend at the other side thereof.

The piece of glass or vitrocrystalline material may be one which is naturally curved. Natural curvature can be imparted to the piece before the chemical tempering treatment, for example, by using a mold or former. Such natural curvature can also be imparted during chemical tempering, e.g., by performing the tempering treatment so as to directly produce compressive stresses at one side only, or at both sides. In the latter case, the stresses on the two sides are unequal. The stresses or the excess stresses at one side of the piece are sufficiently high to cause the piece to bend.

The elastic flexing of the piece of glass during assembly of the article may produce flexure in one plane or in a plurality of planes. Plural-plane flexure affords the advantage that the increase in tensile strength is not concentrated or is not so concentrated in one direction along the material.

An example of a single-plane flexure is the flexure of a flat sheet into a part-cylindrical form, i.e., a form in which the sheet conforms to part of the surface of a cylinder. An example of a plural-plane flexure is the flexure of a flat sheet into a part-spherical form. It should be understood, however, that these are only examples of these forms of flexure. In a plural-plane flexure, the extent of flexure in different planes need not be the same. Moreover, for the purposes of this specification, the elastic straightening of a naturally curved sheet is regarded as a flexing operation, notwithstanding that the sheet may after this operation have no curvature or a curvature less than its normal curvature. The elastic straightening results in further compressive stressing of the convex surface.

In one embodiment of the invention, the article components may include a frame and may be assembled so that the frame at least assists in holding the piece of glass or vitrocrystalline material in its elastically flexed condition. This way of holding the piece of glass in an elastically flexed condition is very simple and enables both sides thereof to be left exposed in the final article if so desired.

In another embodiment of the invention, the article components include the piece of glass or vitrocrystalline material and a load support member. The components are assembled so that the piece of glass is held in facing relationship to the load support member. There is therefore produced an article with mechanical strength and other properties conferred by the combination of facing members.

The piece of glass and the load support member may be mounted in spaced relationship, leaving a space between them. This space may be void or may contain a gaseous medium, e.g. air, or may be filled with an intermediate medium or a loose filling material. The intermediate medium or filling material also contributes to the properties of the article and may, e.g., confer on the article good heat-insulating properties.

Preferably however, the article components are secured together so that the load support member serves as a backing for the piece of glass or vitrocrystalline material. This procedure enables the piece of glass to be firmly supported. It also produces a very strong product. By way of example, the load support member may be a backing which is in the form of a receptacle or other body made of wood, metal or any other suitable material for which the piece of glass or vitrocrystalline material forms a protective coating or lining. Thus, the piece of glass may be used to confer required surface properties or a required appearance to the article, for which latter purpose the piece can, e.g., be colored. Alternatively or in addition the piece of glass or vitrocrystalline material can be used to protect the underlying surface of the backing from contact with dirt or other foreign bodies.

For certain articles it is advantageous for the piece of glass and the load support member to be connected together only at their edges. This form of connection can be employed regardless of the materials of the piece of glass and the second load support member, there being no need to employ any form of intervening adhesive. The piece of glass and the load support member may, e.g., be connected by a frame or clamping means.

Preferably, however, the second load support member serves as a backing for the piece of glass and is secured over substantially the total area of one side. This substantially total connection enhances the strength of the assembly, since the components form a more integral structure. The substantially total connection may, e.g., be achieved by means of an intervening bonding layer. For this purpose it is advantageous to use an intervening flexible sheet of organic material. The use of such a sheet enables the piece of glass or vitrocrystalline material and the backing to be very quickly bonded together by placing the organic sheet between them and subjecting the whole assembly to heat and pressure.

According to a preferred embodiment of the invention, the article components comprise the piece of glass or vitrocrystalline material as a first sheet and the backing as a second sheet, with the first and second sheets secured together to form the plies of a laminate. The use of the invention in the construction of laminates is of particular importance because such products are often used in situations in which the laminate is liable to be struck accidently by hard objects which in the prior art laminates would cause breakage.

In the construction of the laminate including a first member and a load support member in the form of sheets, the load support sheet preferably also provides an exposed face of the laminate. For the construction of such a laminate all that is required are the two sheets and possibly an intervening sheet of organic material for bonding purposes.

In some circumstances it is desirable to construct a laminate according to a method wherein the second sheet is also a sheet of glass or vitrocrystalline material. Such a method is particularly useful for producing glazing panels for use in buildings or in vehicles, e.g., for use as vehicle windshields. Such laminates have particularly valuable properties if the second sheet is also tempered prior to the assembly operation. The tensile strength of the panel is thereby further increased. The second sheet can be tempered by a thermal tempering treatment. Preferably, however, the second sheet is chemically tempered so that the particular advantages of chemically tempering, and notably the fact that it gives the sheet particularly safe breakage characteristics, are realized for both component sheets of the laminate. The chemical tempering treatment of the second sheet can be enhanced by first subjecting it to a surfacing treatment. This latter treatment may, if the second sheet is a sheet of glass, be effected by means of an acid medium or by fire-polishing as described in connection with the treatment of the first sheet.

Advantageously, when producing a laminate comprising first and second sheets of glass or vitrocrystalline material as aforesaid, such sheets are secured together by means of an intervening sheet of organic material. This method of securing the first and second sheets together enables a very satisfactory bond to be achieved. The laminate is also found to possess good light-transmitting properties, e.g., good transparency.

Organic interlayer material for securing first and second glass or vitrocrystalline sheets together preferably comprises at least one intervening sheet which can serve as a safety net or shock-absorbing membrane in the event that sheets become broken by the impact of a body against the panel.

An intervening sheet can, e.g., be a sheet of thermoplastic. A particularly satisfactory interlayer material is polyvinylbutyral. The first and second sheets can be directly secured to the intervening sheet, e.g., by the application of heat and pressure, or by means of bonding layers, e.g., layers of adhesive applied in liquid or paste form, between the first and second sheets and the intervening sheet.

In the construction of laminates according to the invention as above described, the first sheet may be held in its elastically flexed condition at least in part by the second sheet. In this method, the presence of a frame is not necessary, or if a frame is used it does not have to sustain the whole of the elastic recovery forces in the first sheet.

The properties of the laminate can be enhanced by assembling the article components so that in the assembly operation the second sheet is itself held in an elastically flexed condition. Accordingly, the second sheet is given a high resistance to breakage by the impact of small hard objects against the side thereof facing away from the first sheet. The second sheet may be held in such a state of elastic flexure at least in part by the first sheet, in which case the elastic restoring forces in each sheet hold or assist in holding the other sheet in its state of elastic flexure. As an example, a naturally curved first sheet may be secured by its concave side to the concave side of a naturally curved second sheet to form a laminate which is flat. In such a laminate, elastic forces are stored in both sheets and their exposed faces forming the opposed faces of the laminate are subject to compressive stresses created by the act of flexing the sheets to secure them together. Preferably, however, the second sheet is held elastically flexed so that compressive stresses due to such elastic flexure are present in the side thereof which faces the first sheet. In that case the second sheet is better able to yield by flexure to high energy impact forces acting against it which tend to flex the laminate as a whole. The second sheet can thus serve as a shock absorber with respect to such impact forces. By way of example, a laminated panel can be produced according to the invention using first and second sheets which are naturally curved, the first sheet having a more pronounced curvature than the second sheet and the sheets being secured together with the concave side of the first sheet facing the convex side of said second sheet. The result is a laminate having a curvature intermediate the natural curvatures of the two sheets. The resulting laminate can, if desired, be held elastically flexed by means of a frame or some other component, in a condition of reduced curvature, whereby the compressive surface stressing of the convexly curved face of the first sheet is further increased. It is also possible for the second sheet to be held elastically flexed with its inner side compressively stressed, by means of a frame. Thus, first and second sheets which have the same natural curvature can be secured together with the convex face of the first sheet exposed. The resulting laminate can be mounted in a frame which holds the two sheets elastically flexed to a less pronounced curvature so that the exposed face of the first sheet is thereby compressed.

As already referred to, the chemical tempering of a piece of glass or vitrocrystalline material which is to provide one or both exposed faces of a panel as described above, and the assembly of the panel components so that the piece of glass is in an elastically flexed condition, is very advantageous for giving the panel good resistance to breakage by the impact of small hard objects against it, and for avoiding the formation of dangerously sharp pieces in the event that the piece should break. These features are of importance in glazing panels, particularly windshields, as already referred to. In certain cases, however, the tempering and flexing may result in the piece of glass being too resistant to breakage under flexing forces.

According to preferred embodiments, this drawback is avoided by subjecting the piece of glass, at least locally and on at least the side thereof which has been or will be compressed by flexure, to a treatment (hereinafter referred to as "a weakening treatment") which reduces the resistance of the piece in at least one region to breakage by flexure. This treatment imposes tensile forces on the external layers of glass or vitrocrystalline material at that side of the piece of glass which is to be weakened. The weakening treatment can be performed prior to or after assembly of the panel components. By virtue of the weakening treatment, the tensile loading under which the piece of glass will yield by breaking is less than that which is necessary to overcome the compressive stresses existing thereon. Moreover the yield strength of the piece of glass can be controlled independently of the compressive stressing and degree of flexure.

The performance of a weakening treatment is especially advantageous in the manufacture of a panel wherein the piece of glass constitutes one sheet of the panel and is assembled in facing relationship to a second sheet, e.g., a sheet of glass or vitrocrystalline material. The second sheet is capable of being flexed to impose flexing forces sufficient to break the piece of glass. The resulting product shows advantageously that if the panel is subjected to flexure under high energy impact forces acting against the central portion of the panel at the side of the second sheet, the first sheet can yield by breaking while the second sheet is still capable of yielding by further elastic flexure. The second sheet demonstrates thereby a good shock-absorbing effect. This is of special importance for vehicle windshield manufacture to reduce the risk of personal injury to an occupant of the vehicle in the event that he is thrown forcibly against the inside of the windshield due to a sudden braking or collision of the vehicle.

Advantageously, a weakening treatment is performed substantially uniformly over at least one region of the piece of glass. The tensile strength can in that way be brought to a substantially constant value over a given region.

Preferably, a weakening treatment is performed substantially uniformly over the side of the piece of glass which has been or will be compressed by flexure. The weakening treatment can then be more easily performed as part of an industrial process.

One preferred type of weakening treatment is effected by surface abrasion or scratching of the piece. Abrasion can advantageously be effected with a discrete material having a grain size of the order of 10 microns. By means of such an abrasive substance the weakening treatment can be performed easily without causing undesirable defects in the piece, such as scratches which are visible to the naked eye.

Advantageously the weakening treatment includes an abrasion of the piece with a powder substantially composed of iron oxide or cerium oxide or alumina or of a mixture of two or more of these substances.

For producing glazing panels by a method according to the invention, there are advantages in using first and second sheets of glass or vitrocrystalline material where the second sheet is thinner and more easily flexed but has a higher tensile strength than the first sheet. If such a panel is installed in a vehicle or building with the second sheet facing the interior of the vehicle or building, then the second sheet can function as a shock-absorber, as hereinbefore referred to, when the panel is exposed at the inside to high energy impact forces sufficient to cause the first sheet to break by flexure.

The greater thickness of the first sheet in such embodiments is beneficial since it has a high resistance to breakage so that it can withstand the impact of small hard objects, such as stones, against its exposed face.

According to certain embodiments of the method of producing a panel according to the invention, first and second sheets are used; the first sheet being thicker than the second sheet. The first sheet has a thickness in the range of 1.5 to 4.0 mm., and the second sheet has a thickness in the range of 1.0 to 2.5 mm. Panels which are particularly valuable as glazing panels, e.g., in buildings or vehicles, can be produced according to the invention using sheets within those thickness ranges.

The invention includes an article incorporating a plurality of components including a piece of glass or vitrocrystalline materail which provides at least one exposed face of the article. The article as characterized in that the piece of glass has been chemically tempered and is held in an elastically flexed condition such that compressive stresses are present in one face of the piece of glass and that face is exposed. Such an article has good resistance to breakage by the impact of small hard objects against the face which has been compressed by flexure.

According to an advantageous feature of the invention, external layers of glass or vitrocrystalline material in the piece of glass contain fluorine ions. The advantage of this and of other optional features of an article according to the invention are implicit in the statments hereinbefore made concerning the corresponding method features.

Preferably, the compressive surface stresses at the one face extend to at least twice the depth to which compressive stresses extend at the other face of the piece of glass.

It is advantageous for the piece of glass to be held in a state of plural-plane flexure so that the increase in tensile strength resulting from the flexure is not so concentrated in one direction along the material.

The article may include a frame which at least assists in holding the piece of glass or vitrocrystalline material in its elastically flexed condition.

According to certain embodiments, the article includes the piece of glass or vitrocrystalline material and a load support member which is located in facing relationship to the piece of glass.

Preferably a load support member is provided which constitutes a backing for the piece of glass.

In an article incorporating the piece of glass or vitrocrystalline material and a load support member in facing relationship thereto, the piece of glass and the load support member may be connected together only at their edges.

In other preferred embodiments, however, the load support member serves as a backing for the piece of glass or vitrocrystalline material and the latter is secured substantially over the total area of one side to the backing.

According to still other embodiments of the invention, the article includes a first sheet of glass or vitrocrystalline material and a second sheet, which serves as a backing, with both sheets constituting plies of a laminate. Preferably the first and second sheets provide the two exposed faces of the laminate.

It has been found particularly advantageous according to the invention, wherein the second sheet is itself a sheet of glass or vitrocrystalline material. Preferably, the second sheet has been tempered. It may have been tempered by a thermal tempering treatment but it is preferably one which has been chemically tempered.

For many purposes it is highly advantageous for the first and second sheets of glass or vitrocrystalline material to be secured together by an intervening flexible sheet of organic material, preferably a sheet of thermoplastic such as polyvinyl butyral. For example, a windshield according to the invention may incorporate an intervening organic sheet which can serve as a safety net to absorb impact forces in the event the second sheet is broken by the impact of a body against that side of the laminated panel.

In a laminate as described above the first sheet can be held in an elastically flexed condition at least in part by the second sheet. Moreover, it is in many cases advantageous for the second sheet itself to be held in an elastically flexed condition. The second sheet can, for example, be held in an elastically flexed condition at least in part by elastic restoring forces in the first sheet.

Preferably, the second sheet is held elastically flexed so that the side thereof facing the first sheet is compressively stressed as a result of the elastic flexure of the second sheet. The article may, e.g., incorporate a frame for holding or assisting in holding the second sheet in the elastically flexed condition.

In certain articles according to the invention, the tensile strength of the piece of glass or vitrocrystalline material, in at least one region thereof, expressed in terms of the tensile force, is less than the tensile force necessary for reducing the compressive stresses to zero.

As hereinbefore referred to, such a reduced tensile strength can be imparted to the piece of glass by an abrasion or scratching treatment. An article according to the invention may accordingly be one in which the piece of glass bears surface grooves or scratches over at least one reigon thereof at one side. Such grooves or scratches preferably have a depth of less than 5 microns.

The advantages of reduced tensile strength are, in particular, realized in articles according to the invention in which the piece of glass is a sheet which is in facing relationship to a second sheet. The second sheet is capable of being flexed to impose flexing forces on the piece of glass sufficient to break it. In articles of this kind, the second sheet is preferably thinner and more easily flexed than the first sheet. It is recommended that the first sheet have a thickness in the range 1.5 to 4.0 mm. and the second sheet have a thickness in the range of 1.0 to 2.5 mm.

DESCRIPTION OF THE PREFERRED EMBODIMENTS

The preferred embodiments can best be understood by reference to the following six examples:

Example 1

Figure 1A:
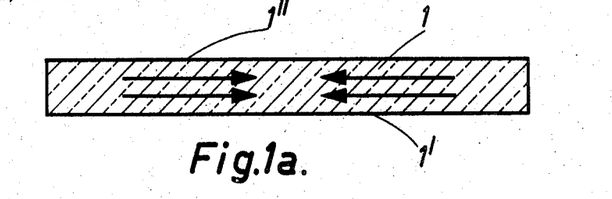
FIGS. 1a and 1b are schematic sectional views of a tempered glass sheet before and after mounting in a frame to form an article according to the invention.
Figure 1B:
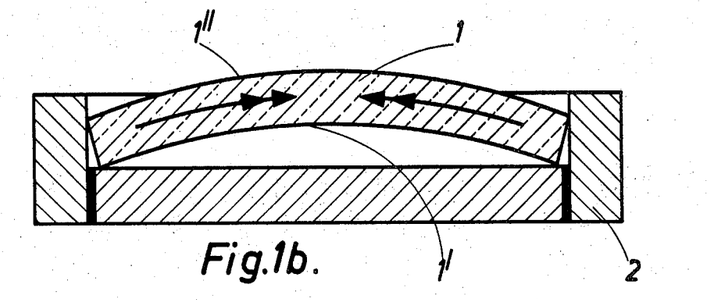

A panel was made which incorporated a glass sheet 1 shown in FIG. 1a, the glass being of the following composition by weight:

| | Percent |
|---|---|
| $SiO_2$ | 68 |
| $Na_2O$ | 22 |
| CaO | 9 | the remainder comprising impurities. This glass sheet had a thickness of 2 mm. and was chemically tempered by immersing it for 24 hours in a bath of molten potassium nitrate at 470° C. During this treatment, sodium ions in external layers of the glass were replaced by potassium ions with the result that compressive surface stresses were produced in the sheet as represented by the arrows in FIG. 1a. The compressive stresses at the opposite faces of the sheet are of the same magnitude. After cooling the sheet, it was elastically flexed in a single plane and was mounted in a frame 2 with internal length and width dimensions a little smaller than those of the glass sheet. In order to mount the glass sheet in the frame the sheet had to be elastically flexed. The frame then held the sheet in its elastically flexed condition as shown in FIG. 1b. By the flexing of the sheet, face 1' of the sheet was placed under additional compressive stress as represented by the use of double-headed arrows in FIG. 1b. At the same time the compressive stressing at face 1'' was reduced.

In the completed panel shown in FIG. 1b the glass sheet showed a high resistance to breakage by the impact of small hard stones projected against the concave face 1'. This was due to the fact that high compressive stresses were present in surface layers of greater depth at the face 1' as a result of the elastic flexure of the sheet 1.

Small pieces of gravel were projected against the concave face 1' of each of a series of panels produced in the manner just described. In 90% of the tests it was found that the glass sheet was apparently unaffected when hit by the gravel travelling at 70 km. per hour, or at most a dent from 50 to 100 microns in depth appeared in the face 1'. In no case were there any cracks in the glass radiating from the indentation.

The extent to which the compressive stresses produced in face 1'' by the chemical tempering treatment were reduced by the figure of the sheet depended on the magnitude of the compressive stresses induced at that face by the chemical tempering operation and on the degree to which the sheet was elastically flexed. It would be possible in any given embodiment of the kind presented by this example to relate the compressive stressing by chemical tempering and the degree of elastic flexure so that the completed panel face 1'' is no longer compressively stressed or the completed panel face 1'' is under slight tensile stress.

Instead of symmetrically compressively stressing the opposed faces of the sheet by chemical tempering, the sheet could be subjected to chemical tempering, under the influence of an electric field in order to compressively stress one side of the sheet more than the other. By such means an initial curvature could be imparted to the sheet preparatory to elastic flexure thereof in one direction or the other.

A panel as shown in FIG. 1b can advantageously be used as a viewing window with the concave side of the glass sheet facing outwardly so that the window is substantially non-reflecting.

Example 2

Figure 2A:
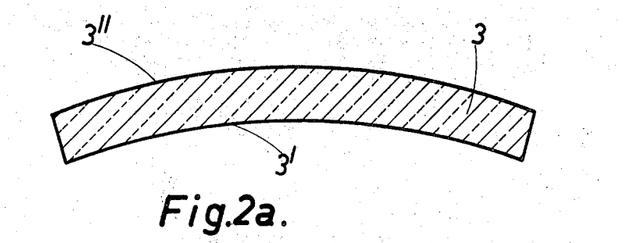
FIGS. 2a and 2b are schematic sectional views of a tempered glass sheet before and after attachment to another sheet to form an article according to the invention.

A panel was made which incorporated a glass sheet 3 having a natural curvature in one plane as shown in FIG. 2a. The natural curvature was imparted to the sheet by heating the sheet, while supported on a shaped form, to a temperature sufficient to cause the sheet to become deformed under its own weight until it assumed the curvature of the form. The sheet was composed of a soda-lime glass having substantially the following composition by weight:

| | Percent |
|---|---|
| $SiO_2$ | 71.0 |
| $Al_2O_3$ | 2.0 |
| $Na_2O$ | 12.0 |
| CaO | 12.0 |
| MgO | 2.0 |

The sheet was chemically tempered by immersing it for 20 minutes in a bath containing 2% $LiNO_3$ and 98% NaCl at a temperature of 580° C. During the period of the immersion of the sheet in the bath, sodium ions in external layers of the glass were replaced by lithium ions. On the removal of the glass sheet from the bath, the sheet was cooled and due to the different coefficient of thermal expansion conferred on the external layers of glass by the replacement of lithium for sodium ions, compressive stresses were set up in the external layers during the cooling of the sheet.

Figure 2B:
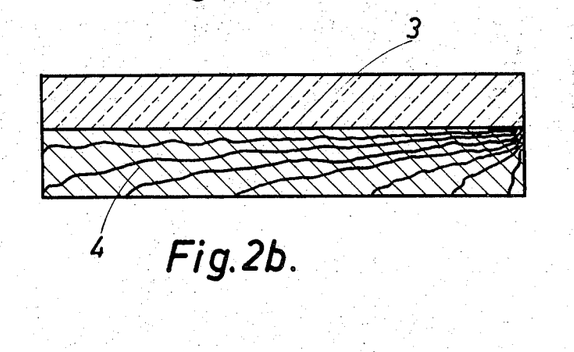

The chemically tempered curved glass sheet 3 was then elastically flexed into a flat condition and secured by its naturally curved face 3' to a wooden panel 4 to form the laminate shown in FIG. 2b. The wooden panel was sufficiently rigid to resist the elastic recovery forces in the glass sheet so that the glass sheet was held in the flat condition by the wooden panel. The glass sheet was secured to the wooden panel by means of an adhesive, such as an epoxy resin adhesive (e.g. a "Thiokol" adhesive). The adhesive was spread over the wooden panel and the concave face 3' of the glass sheet prior to bringing them together. As a result of the elastic flexure of the glass sheet to bring it into the flat condition in which the sheet is held in the panel, additional compressive stresses were set up in the external layers of glass adjacent face 3" of the glass sheet. As a result, the glass sheet was particularly resistant to breakage by the impact of small hard objects against the exposed face 3" of the panel. The glass sheet served to protect the wooden panel while leaving the natural grain of the wood clearly exposed to view.

It was necessary to ensure that the compressive stressing of the external layers of glass adjacent face 3' by the chemical tempering treatment was sufficient to avoid that side of the sheet being tensioned to the limit of its tensile strength in the act of elastically flexing the sheet into a flat condition.

Particularly high compressive surface stresses would be produced in the sheet 3 by the chemical tempering operation if the sheet were subjected prior to chemical tempering to a surfacing treatment by means of an acid medium, e.g., by immersing the sheet for 3 minutes in an aqueous solution containing 7% by volume of hydrofluoric acid (concentration 70%). As an alternative to surfacing the glass by means of an acid medium, the surfacing treatment could be a fire-polishing treatment. Such a fire-polishing treatment could be performed by preheating the glass sheet to 450° C. and then holding the glass sheet over a flame produced by passing a mixture of compressed air and propane upwardly through a porous refractory plate and igniting the gas issuing from the top of the plate, first one face of the sheet and then the other face thereof being turned towards the flame for a period of 45 seconds to increase the temperature of that face to 660° C.

By way of modification of the method described with reference to FIGS. 2a and 2b a panel was produced in the same way but using, instead of the glass sheet 3, a sheet of vitrocrystalline material having the following general composition by weight:

| | Percent |
|---|---|
| $SiO_2$ | 48.0 |
| $Al_2O_3$ | 32.0 |
| $Na_2O$ | 10.0 |
| CaO | 2.0 |
| $TiO_2$ | 8.0 |

The vitrocrystalline sheet was prepared by bringing about partial devitrification (in a known manner) of a sheet of glass having the above composition. The final panel was produced by securing the vitrocrystalline sheet, elastically flexed into a flat condition, to a wood panel such as panel 4 in FIG. 2b. The appearance of the natrual grain of the panel 4 was modified due to the partially crystalline form of the covering sheet 3. At the same time, the vitrocrystalline sheet showed very good resistance to breakage by the impact of small hard objects against its exposed face due particularly to the compressive stresses set up in the external layers of vitrocrystalline material adjacent that face by the elastic flexure of the sheet.

In a further modification, a panel was produced as described with reference to FIGS. 2a and 2b but using in combination with the glass sheet 3, and in place of the wooden panel 4, a panel with an asbestos-cement coating, on the side to which the glass sheet was to be secured, with a decorative enamel comprising 45% of $SiO_2$, 14% $B_2O_3$, 20% PbO, 10% ZnO and 11% $Li_2O$ (the percentages being by weight). The glass sheet was secured to the enamelled surface by means of an epoxy resin glue. The resulting panel was very suitable for use as an external or internal wall cladding. The enamel coating, visible through the glass sheet, imparted a very pleasing appearance to the panel. The lustre of the enamel coating appeared to be enhanced by the presence of the covering sheet of glass and the glass sheet protected the enamel from deterioration and loss of lustre by exposure to the atmosphere. Due to this protecting action of the glass sheet, it was possible to use the relatively low melting point enamel above specified. In the absence of the glass coating it would be necessary to use an enamel incorporating refractory oxides giving the enamel a much higher melting temperature.

Example 3

Figure 3A:
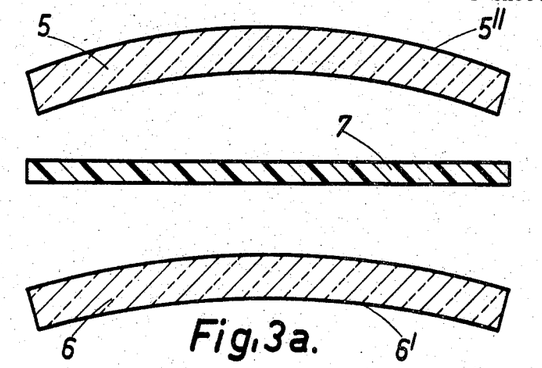
FIGS. 3a and 3b are schematic sectional views of two sheets of glass before and after lamination to form an article according to the invention.
Figure 3B:
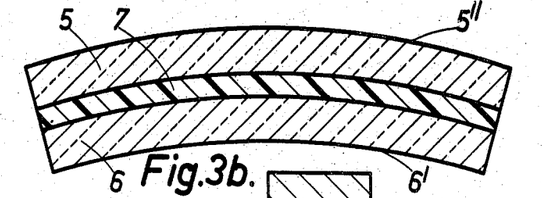

A panel was produced which incorporated two glass sheets 5 and 6, each having a natural curvature in one plane as shown in FIG. 3a. The sheet 5 had a radius of curvature somewhat smaller than the radius of natural curvature of sheet 6. The two glass sheets, which were 3 mm. in thickness and were composed of a soda-lime glass having the same composition as the glass sheet 1 used in Example 1, were chemically tempered by immersing them for 24 hours in a bath of potassium nitrate at 450° C. After removal of the sheets from the bath they were cooled. Sheet 5 was flexed to a curvature less than its natural curvature and sheet 6 to a curvature greater than its natural curvature. The sheets were then secured together, with the concave surface of sheet 5 facing the convex surface of sheet 6. The sheets were secured by means of an intervening sheet 7 of 0.8 mm. in thickness and of polyvinyl butyral "high impact" to form a laminate as shown in FIG. 3b. The lamination was effected by subjecting the sheets to heat and pressure in a known manner. In the completed panel the elastic recovery forces in the two sheets acted in opposition to hold the laminate in equilibrium at a curvature intermediate the natural curvatures of the sheets 5 and 6. Due to the elastic flexure of the sheets, the compressive surface stresses at face 5" of Sheet 5 and face 6' of sheet 6 were higher after lamination than before lamination. As a result the laminate had a high resistance to breakage under the impact of small hard bodies such as pieces of gravel against either side of the laminate.

The laminate was suitable for use as a glazing panel, e.g. a vehicle windshield.

A laminate substantially as shown in FIG. 3b but having even greater resistance to indentation by small hard objects striking the convex 5" could be produced by the same method but using a sheet 5 of greater thickness, e.g. a sheet of 3.2 mm. in thickness. In that case the inner sheet 6 could be a thinner sheet, e.g. a sheet of 1.2 mm. in thickness so that it has a high flexibility for promoting shock absorption in the case of high energy impact of a rounded body, against face 6' of the panel. Such a panel would be particularly valuable as a vehicle windshield where impact of the head of a driver or passenger against the inside of the windshield may occur due to front collision or hard braking.

In a further modification, panels were produced as described with reference to FIGS. 3a and 3b but using with the glass sheets 5 and 6 and in place of the intervening sheet of polyvinyl butyral 7, a frame (not shown) in order to hold the glass sheets 5 and 6 in a state of elastic flexure such that the curvature of the sheet 5 is less than its natural curvature and the curvature of the sheet 6 is greater than its natural curvature. Moreover the sheets 5 and 6 are maintained separated one from the other by a space which may be filled with a gaseous medium, e.g. air, or with loose filling material.

Example 4

Figure 4A:
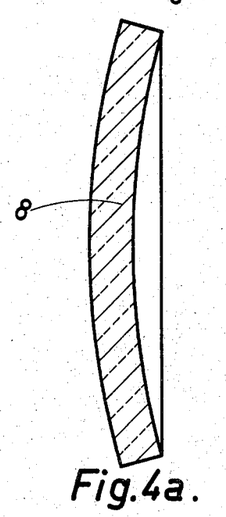
FIGS. 4a and 4b are schematic sectional views of a window pane before and after mounting in a frame to form an article according to the invention.
Figure 4B:
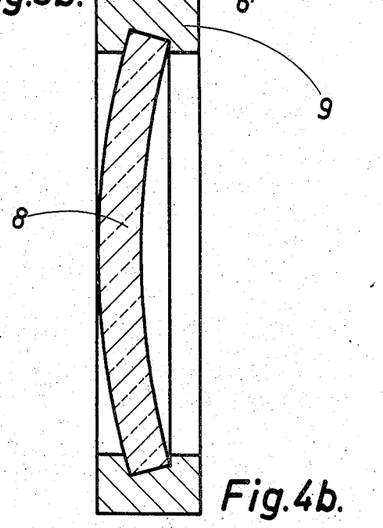

A glass panel was made as represented in FIGS. 4a and 4b. The components used in the construction of the panel were a piece of glass 8 and a frame 9. The piece of glass had a natural curvature such that its main faces conformed to portions of the surface of a sphere. The piece of glass was 1.2 mm. in thickness. It was chemically tempered by causing sodium ions in surface layers of the glass to be replaced by potassium ions at a temperature of 450° C., using molten potassium nitrate as the treatment medium. After cooling the tempered piece of glass, it was mounted in the frame 9 which was formed so as to hold the piece of glass in a state of reduced curvature. As a result, the surface layers of glass at the convex side of the piece 8 were additionally compressed. The panel was used as an instrument dial cover. It was highly resistant to breakage under accidental impact of hard bodies against the exposed face of the piece of glass due to the depth of the highly compressively stressed surface layers produced by the elastic flexure thereof.

A panel as represented in FIG. 4b could of course be used for purposes other than that described above. For example, the panel could be used as a viewing or inspection window in a chamber or tank. If in such case it should be desired to make the panel less resistant to breakage under forces acting against the concave side of the glass, e.g., to permit the opening in which the panel is fitted to be used as a rapid escape hatch or to prevent excess buildup of pressure in the chamber or tank, the convex face of the chemically tempered piece of glass could be subjected before or after mounting it in the frame 9 to an abrasion treatment. This could be achieved by means of a sand composed of grains having a mean diameter of 10 microns. Such an abrasion treatment can be performed so as to reduce the tensile strength of the glass at the convex side of the piece but without noticeably spoiling the optical properties of the glass. In the event of breakage of the glass it would break into small blunt fragments due to the internal stresses set up by the chemical tempering treatment.

Example 5

Figure 5A:
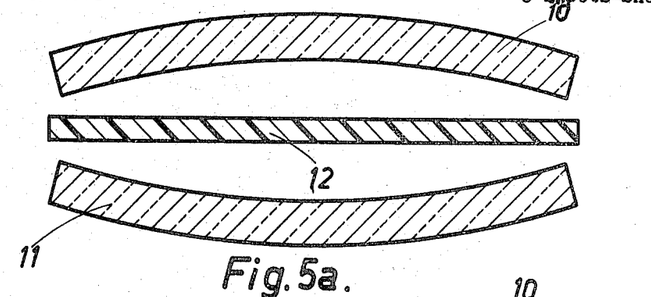
FIGS. 5a and 5b are schematic sectional views of the plies of another laminate according to the invention before and after lamination.
Figure 5B:
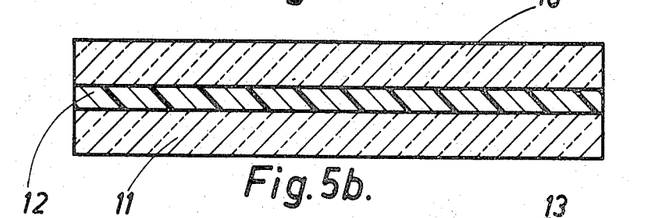

A laminated panel was made as represented in FIGS. 5a and 5b. The components used in the construction of the panel were two sheets 10 and 11 of soda-lime glass each having a thickness of 3.0 mm. and having a natural curvature in one plane, and a sheet 12 of polyvinyl butyral 0.76 mm. in thickness.

Before assembling the components, the two sheets of glass were chemically tempered by immersing them for 24 hours in a bath of molten potassium nitrate at 450° C. After cooling, the chemically tempered glass sheets were assembled on opposite sides of the polyvinyl butyral sheet with their concave sides facing plastic sheet 12 as shown in FIG. 5a. The assembly of sheets was then subjected to heat and pressure to cause the glass sheets 10 and 11 to be elastically flexed into a flat condition and to become secured together by means of the sheet 12 of polyvinyl butyral which softened under the laminating temperature. In the completed panel, each of the glass sheets was held in a flat condition against the action of its internal elastic recovery forces, by the other glass sheet. As a result, the layers of glass at the exposed faces of the two sheets were highly compresively stressed. The compresive stresses were due in part to the chemical tempering of the sheets and in part to the sheets being held elastically flexed. The panel was therefore highly resistant to breakage by the impact of small hard objects against either face thereof.

In the act of flexing the glass sheets to bring about the lamination, the naturally concave faces of the sheets were, of course, subjected to stretching forces and it was important to ensure that the glass was not tensioned to the limit of its tensile strength. Actually, the tensile loading on the concave faces of the sheets was not sufficient to overcome the compressive surface streses established at those faces by the chemical tempering treatment. In order to achieve a greater degree of elastic flexure when making a panel of the kind represented by FIG. 5b, a high compressive surface stressing of the sheets by chemical tempering is desirable. This result can be promoted by subjecting the glass sheets, before they are chemically tempered, to a surfacing treatment, e.g., by contacting the faces of the sheets for 60 minutes with an aqueous solution at 20° C. and having the following composition:

| | Litres |
|---|---|
| Water | 8.8 |
| $H_2SO_4$ | 0.6 |
| HF (70% concentration) | 0.6 |

As an alternative surfacing treatment, superficial faults in the faces of the glass sheets could be removed or reduced by subjecting the faces of the sheets to a mechanical polishing treatment, e.g. successive polishing operations with different sands the grains of which are decreasing in dimensions and with $Fe_2O_3$.

It is particularly recommended, however, to surface the glass sheets by means of an acid medium containing fluorine ions. When using such a surfacing medium, a better mechanical resistance and an increased resistance of the glass sheets to iridescence may be noted.

As only the naturally concave faces of the glass sheets are subjected to stretching forces when the sheets are elastically flexed, a surfacing treatment as aforesaid could be confined to such concave faces, if so desired.

Instead of chemically tempering the glass sheets by causing sodium ions in surface layers of the glass to be replaced by potassium ions, the sheets could be tempered by causing sodium ions to be replaced by lithium ions at a temperature of 580° C. and then cooling the sheets.

Example 6

Figure 6A:
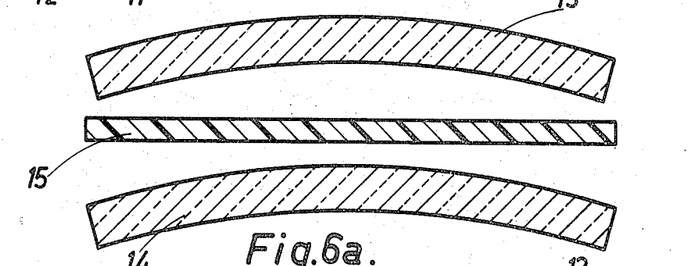
FIGS. 6a and 6b are schematic sectional views of the plies of another laminate according to the invention before and after lamination.
Figure 6B:
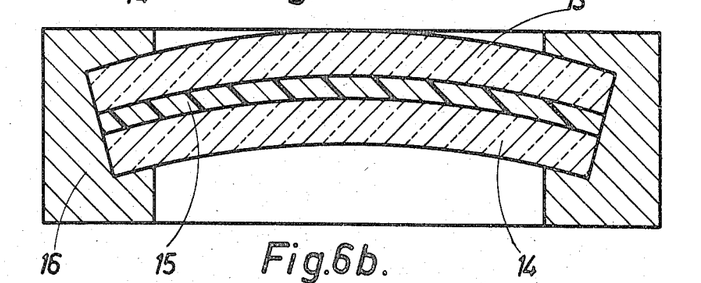

A panel was made as represented in FIGS. 6a and 6b. The components used in the construction of the panel were two sheets 13 and 14 of an ordinary soda-lime glass each having a thickness of 2.5 mm., a sheet 15 of polyvinyl butyral 0.76 mm. in thickness and a frame 16. The glass sheets 13 and 14 were naturally curved in one plane. The curvatures of the two sheets were identical. The two sheets were chemically tempered by immersing them for 24 hours in a bath of molten potassium nitrate at 450° C. After cooling the glass sheets were assembled on opposite sides of the sheet of polyvinyl butyral with the concave sides of the two glass sheets facing in the same direction, as shown in FIG. 6a. The assembly of sheets was then subjected to heat and pressure to cause the sheets to become firmly secured together, thereby forming a three-ply laminate. The laminate was then mounted in the frame 16. This frame was so formed as to receive and hold the laminate in a state of reduced curvature. In other words, the laminate was held in the frame in a state of elastic flexure such that compressive stresses were present in the naturally convex faces of the two glass sheets as a result of the elastic flexure of such sheets. The resulting laminate had a high resistance to breakage under the impact of small hard objects striking the exposed convex face of sheet 13. This resistance was estabilshed by a test as described in Example 1 in which pieces of gravel were projected against the convex face of the laminate. The laminate also had a high resistance to breakage under pressures acting against the concave side of the sheet 14 and tending to increase the curvature of the sheets in the panel. The panel produced as described above was therefore very well suited for use as a vehicle windshield with the convex face of the laminate on the outside of the vehicle. The intersheet 15 of plastic would serve as a safety membrane to prevent or reduce the risk of the head of a person in the vehicle being forced through the windshield in the event of a collision.

In a modification of the panel shown in FIGS. 6a and 6b, a sheet 13 of glass which had a somewhat smaller radius of natural curvature than the sheet 14 was used. As a result of the difference in curvature of the two glass sheets, each sheet was held in the laminate in a state of elastic flexure by the other glass sheet. The natural curvature of the laminate, i.e., its curvature before it was mounted in the frame 16, was intermediate the nature curvatures of the two glass sheets. The naturally convex face of sheet 13 and the naturally concave face of sheet 14 were compressively stressed as a result of the flexure. The laminate was then mounted in the frame 16 and held thereby in a state of reduced curvature. Due to the elastic flexure of the glass sheets in the course of lamination, the compressive stressing of the convex face of sheet 13 in the final laminate was higher than it would otherwise have been. On the other hand, the flexure of sheet 14 which occurred when the laminate was flexed for mounting it in the frame 16, tended merely to assist recovery of the elastic forces stored in sheet 14 so that the layers of glass at the concave face thereof were subjected to a state of reduced compressive stress.

In a further modification of the panel shown in FIGS. 6a and 6b the glass sheet 14 was replaced by a sheet of acrylic plastic 12 mm. in thickness and having the same natural curvature as the glass sheet 13. The sheet 15 of polyvinyl butyral was dispensed with. The glass sheet 13 and the acrylic plastic sheet were secured together by means of an adhesive such as a layer of neoprene or nitrile or silicone resin. As an alternative they could be secured together without using an adhesive and merely by subjecting the two sheets to heat and pressure. The resulting two-ply laminate was then mounted in a frame so that the frame held the laminate elastically flexed in a direction such that the convex face of the glass sheet 13 contained compressive stresses thereon. In the resulting panel, the glass sheet 13 had good resistance to breakage under the impact of small hard objects against its exposed convex face. The panel as a whole had good shock-absorbing properties with respect to impact forces acting against the acrylic plastic sheet and tending to increase the curvature of the laminate. The acrylic plastic sheet exhibited a high degree of flexibility so that when a given flexing load was exceeded the glass sheet 13 broke into small blunt fragments, leaving the acrylic plastic sheet free to undergo further flexure. When manufacturing such a panel, the resistance of the glass sheet 13 to breakage under flexing forces acting against the concave face of the laminate could be reduced by subjecting the convex face of the glass sheet 13 to a weakening treatment by abrasion in one or more zones. This could be achieved, e.g., by means of an abrasive powder comprising a mixture of cerium oxide and alumina. By such a treatment the tensile strength of the glass at the convex face of the sheet 13 can be reduced without spoiling its transparency or losing its high resistance to breakage which it possesses by reason of its being held in a state of elastic flexure. A weakening treatment on the convex face of the glass sheet could be performed after securing the glass sheet to the sheet of acrylic plastic or before such lamination step. In the latter case the weakening treatment could be performed before or after chemically tempering the glass sheet.

In the foregoing examples, glass sheets composed of soda-lime glasses have been used. It is to be understood however that the composition of the glass is not critical and other kinds of glasses can be used, e.g., a boro-silicate glass such as a boro-silicate glass of the composition: $SiO_2$ 64.7%, $B_2O_3$ 14.5%, $Na_2O$ 19.9%, $CaO$ 0.14% $Al_2O_3$ 0.7%, $Fe_2O_3$ 0.06%, and traces of MgO (the percentages being by weight).

It will be understood that the above description of the present invention is susceptible to various modifications, changes and adaptations, and the same are intended to be comprehended within the meaning and range of equivalents of the appended claims.

What is claimed is:

1. A method of making an article from a plurality of components including a first component constituted by a first sheet of glass or vitrocrystalline material which provides at least one exposed face of the article and at least one second component which includes a load support sheet, comprising the steps of:
   (a) chemically tempering said first sheet of glass or vitrocrystalline material;
   (b) bending said first sheet of glass or vitrocrystalline material into an elastically flexed condition, while said first sheet is at a temperature which substantially prohibits it from being inelastically deformed, to an extent sufficient to apply increased compressive stresses to one face of said first sheet;
   (c) assembling said first sheet of glass or vitrocrystalline material with said load support sheet, while said first sheet remains elastically flexed, so that said one face is exposed and the opposite face of said first sheet is in facing relation to said load support sheet; and
   (d) maintaining said first sheet of glass or vitrocrystalline material in said elastically flexed condition by at least one said second component.

2. A method as defined in claim 1, wherein the chemical tempering includes replacement of ions in the surface layers of said first sheet by larger ions at a temperature which is too low to permit complete stress relaxation in the material of the glass to occur during the tempering.

3. A method as defined in claim 1, wherein the chemical tempering includes replacement of ions in surface layers of said first sheet by ions which confer on the material of said first sheet a lower coefficient of thermal expansion, such ion exchange occurring at a temperature high enough to allow stress relaxation to occur in the material of said first sheet during the tempering.

4. A method as defined in claim 1 comprising, prior to tempering, surface treating one face to improve the quality of said face in at least one part of its area.

5. A method as defined in claim 4, wherein said one face belongs to a sheet of glass and said surface treating includes using a solvent which removes superficial surface layers from said one face in at least one part of its area.

6. A method as defined in claim 5, wherein said surface treating includes using fluorine-containing medium.

7. A method as defined in claim 4, wherein said surface treating includes fire-polishing said one face in at least one part of its area.

8. A method as defined in claim 1, wherein said chemical tempering includes diffusing ions into both faces of said first sheet and bending said first sheet to such a degree that compressive stresses at said one face are present to a depth which is at least twice the depth to which compressive surface stresses are present at the other face of said first sheet.

9. A method as defined in claim 1, wherein the bending is such that the elastically flexed condition in which said first sheet is held in the article is a plural-plane elastic flexure.

10. A method as defined in claim 1, wherein one of said second components is a frame and wherein said first sheet is maintained in said elastically flexed condition at least in part by said frame.

11. A method as defined in claim 1, including securing said article components together so that said load support sheet serves as a backing for said first sheet.

12. A method as defined in claim 11, including connecting said first sheet and said load support sheet together only at their edges.

13. A method as defined in claim 12, including securing said first sheet over its whole area to said backing.

14. A method as defined in claim 13 comprising and securing said first and load support sheets together so as to constitute plies of a laminate.

15. A method as defined in claim 14, including securing said article components together so that said first and load support sheets provide the exposed faces of the laminate.

16. A method as defined in claim 14, wherein said load support sheet is a sheet of glass or vitrocrystalline material.

17. A method as defined in claim 16, including chemically tempering said load support sheet prior to assembly.

18. A method as defined in claim 14 including securing said first and load support sheets together by means of an intervening sheet of organic material such as polyvinyl butyral.

19. A method as defined in claim 14 including assembling the article components so that said first sheet is held in an elastically flexed condition at least in part by said second sheet.

20. A method as defined in claim 14, wherein in the assembly operation said second sheet is maintained in an elastically flexed condition.

21. A method as defined in claim 20, wherein in the assembly operation said second sheet is maintained in an elastically flexed condition at least in part by elastic recovery forces in said first sheet.

22. A method as defined in claim 20, including assembling the article components so that said second sheet is held in a state of elastic flexure such that compressive stresses due to said elastic flexure are present in the face of said second sheet which faces said first sheet.

23. A mthod as defined in claim 22, wherein the panel components include a frame, and including assembling said components so that both said first sheet and said second sheet are held in an elastically flexed condition at least in part by said frame.

24. A method as defined in claim 1 further comprising weakening said first sheet at least locally and on said one face thereof for reducing the resistance of said first sheet in at least one region thereof to breakage by flexure.

25. A method as defined in claim 24, wherein said step of assembling includes placing said first sheet and said load support sheet in facing relationship so that said load support sheet can be flexed to impose flexing forces on said first sheet sufficient to break it.

26. A method as defined in claim 25, wherein said load support sheet is thinner and more flexible than said first sheet.

27. A method as defined in claim 24, including performing said weakening treatment substantially uniformly over at least one region of said first sheet.

28. A method as defined in claim 24, including performing said weakening treatment over substantially the whole of said one face of said first sheet.

29. A method as defined in claim 24, wherein said weakening treatment is effected by surface abrasion or scratching of said first sheet.

References Cited
UNITED STATES PATENTS
| | | | |
|---|---|---|---|
| 3,214,213 | 10/1965 | Hezler, Jr. et al. | 65—30 X |
| 3,317,297 | 5/1967 | Ray | 65—30 |
| 3.218,220 | 11/1965 | Weber | 65—30 X |

FOREIGN PATENTS
| | | | |
|---|---|---|---|
| 1,133,091 | 7/1962 | Germany | 65—36 |

ARTHUR D. KELLOGG, Primary Examiner

U.S. Cl. X.R.

65—35, 104